US008444182B2

United States Patent
Kuo et al.

(10) Patent No.: US 8,444,182 B2
(45) Date of Patent: May 21, 2013

(54) WATER INTAKE PIPE OF OCEAN THERMAL ENERGY CONVERSION POWER PLANT

(75) Inventors: Fang-Sheng Kuo, Taichung (TW); Chung Hsuan Kuo, Taichung (TW)

(73) Assignees: Sea Energy Technology Co, Ltd., Taichung (TW); Fan-Sheng Kuo, Taichung (TW); Chung Hsuan Kuo, Taichung (TW)

( * ) Notice: Subject to any disclaimer, the term of this patent is extended or adjusted under 35 U.S.C. 154(b) by 320 days.

(21) Appl. No.: 12/940,003

(22) Filed: Nov. 4, 2010

(65) Prior Publication Data

US 2012/0111438 A1    May 10, 2012

(51) Int. Cl.
*F16L 35/00*    (2006.01)
(52) U.S. Cl.
USPC ............ 285/114; 285/116; 285/412; 285/235
(58) Field of Classification Search
USPC ................... 285/114, 116, 412, 368
See application file for complete search history.

(56) References Cited

U.S. PATENT DOCUMENTS

| | | | | |
|---|---|---|---|---|
| 833,426 | A * | 10/1906 | Taube | 285/114 |
| 904,586 | A * | 11/1908 | White | 285/114 |
| 993,934 | A * | 5/1911 | Witzenmann | 285/114 |
| 1,953,006 | A * | 3/1934 | Norris | 285/114 |
| 3,232,640 | A * | 2/1966 | Donkle, Jr. | 285/114 |
| 3,501,173 | A * | 3/1970 | Linder et al. | 285/114 |
| 3,819,210 | A * | 6/1974 | Daniel et al. | 285/114 |
| 4,204,707 | A * | 5/1980 | Lincicome et al. | 285/114 |
| 4,470,621 | A * | 9/1984 | Irvine | 285/114 |
| 4,497,342 | A * | 2/1985 | Wenzel et al. | 137/565.17 |
| 4,911,206 | A * | 3/1990 | Gropp et al. | 285/114 |
| 5,299,840 | A * | 4/1994 | Heye | 285/114 |
| 6,837,523 | B2 * | 1/2005 | Surjaatmadja et al. | 285/114 |
| 7,080,858 | B2 * | 7/2006 | Sanches et al. | 285/114 |
| 7,562,908 | B2 * | 7/2009 | Nuccitelli | 285/114 |
| 7,870,732 | B2 * | 1/2011 | Kuo | 60/641.6 |
| 8,182,176 | B2 * | 5/2012 | Bailey et al. | 138/118 |

* cited by examiner

*Primary Examiner* — David E Bochna
(74) *Attorney, Agent, or Firm* — Wang Law Firm, Inc.; Li K. Wang; Stephen Hsu

(57) ABSTRACT

A water intake pipe of an ocean thermal energy conversion power plant is made by connecting a plurality of connecting sections, and each connecting section includes a plurality of steel ropes between two flange disks and covered with a soft tube material, and each connecting section is in a cage form and fixed by the flange disks, and the water intake pipe includes a support, and the closer the connecting section to the sea surface, the higher is the load-carrying capacity of each steel rope, and the steel rope closer to the sea surface has a greater tension.

8 Claims, 9 Drawing Sheets

WATER INTAKE PIPE OF OCEAN THERMAL ENERGY CONVERSION POWER PLANT

BACKGROUND OF THE INVENTION

1. Field of the Invention

The present invention relates to a water intake pipe of an ocean thermal energy conversion (OTEC) power plant, and more particularly to a water intake pipe extended into the bottom of a deep sea for pumping and obtaining cold sea water.

2. Description of the Related Art

In the principle of ocean thermal energy conversion, a working medium (such as oxygen) absorbs heat from warm sea water contained in an evaporator to transform into a vapor form, and the working medium in the vapor form is used for driving a turbine to generate electric power, and the vapor of the working medium is transmitted into a condenser, and the cold sea water is used for exchanging heat to condense the working medium in the condenser, and the condensed working medium is returned to the evaporator for further cycle uses.

Since most of the ocean thermal energy conversion devices are large devices, basic equipments required for the heat exchange to suck and obtain deep cold sea water must have a water intake pipe with sufficient length and diameter to be extended into the bottom of the deep sea. With reference to FIG. 9 for a conventional water intake pipe 9, the water intake pipe 9 is formed by connecting a plurality of connecting pipes 90 having a flange disk structure, and such connecting pipes 90 can be made of a rigid material such as steel or a flexible material such as the fabric of a fire hose.

The speed of pumping cold sea water for the electric power generation is up to 100~1000 m$^3$/sec, but it is difficult to overcome the structure of a water intake pipe made by connecting steel pipes, since the weight is heavy and the cost is high. On the other hand, it is difficult for the water intake pipe made by connecting soft tubes to overcome the water pressure of 80~100 kg/cm$^2$ in order to pump water at a position of 800 m~1000 m below sea level and transmitting the water in a relatively long distance. In addition to the difficulty of pumping water from the bottom of the deep sea at a very high water pressure by the water pump installed in a ship 91 at sea surface, so that when the cold sea water is pumped, a pressure is produced to squeeze and deform an internal wall of the water intake pipe 9, and the deformation is most significant at the top of the water intake pipe. Now, the quantity of pumped water may be decreased by the reduced diameter of the water intake pipe 9, and thus some water pumps are installed at the bottom of the water intake pipe in some designs, but issues including the installation, repair and maintenance and practical application of the water pump installed at the bottom of the water intake pipe 9 still require breakthroughs, and thus the conventional design is not adopted in practical applications. Obviously, the aforementioned drawbacks are the main issues of the conventional water intake pipe 9 used for pumping and obtaining the cold sea water, and it is a main subject for the present invention to overcome the foregoing conventional water intake pipe.

SUMMARY OF THE INVENTION

Therefore, it is a primary objective of the present invention to provide a water intake pipe of an ocean thermal energy conversion power plant, and the water intake pipe has a sufficient length and strength to be extended to the bottom of a deep sea, and a support means for maintaining the diameter of the water intake pipe made of a flexible material, so that a sufficient quantity of cold sea water can be pumped from the bottom of the deep sea successfully and provided for a heat exchange in an ocean thermal energy conversion operation, and a better power generation efficiency can be achieved.

The water pump used for the ocean thermal energy conversion operation is installed at an end of the water intake pipe proximate to the sea, and the water intake pipe of the present invention comprises: a plurality of connecting sections, each connecting section including two flange disks, a plurality of steel ropes, and a flexible tube, and each connecting section being fixed by each corresponding flange disk, and the plurality of steel ropes of each connecting section being coupled around the two flange disks to constitute a cage form, wherein both ends of each steel rope are connected to the peripheries of the two flange disks respectively, and the flexible tube disposed between two flange disks is covered onto an external side of the plurality of steel ropes.

The water intake pipe includes a support means, and the support means includes a plurality of steel ropes of each connecting section, and the size and quantity of the steel ropes may vary, such that each connecting section has a higher load-carrying capacity when a steel rope gets closer to a sea surface, and a steel rope closer to the sea surface has a greater tension for supporting the flexible tube to be enclosed in a diameter capable of bearing the pressure caused by the pumping of sea water.

The technical characteristics, effects and advantages of the present invention will become apparent with the detailed description of preferred embodiment together with the illustration of related drawings as follows. Of course, some elements, arrangements of the elements may be modified in other embodiments of the present invention, but the preferred embodiments and related drawings are provided for the purpose of illustrating the structure of the present invention only.

DETAILED DESCRIPTION OF THE PREFERRED EMBODIMENTS

With reference to FIGS. 1 to 6 for a structure of a water intake pipe in accordance with a first preferred embodiment of the present invention, this embodiment is provided for illustrating the present invention, but not intended to limit the scope of the invention.

Figure 1:
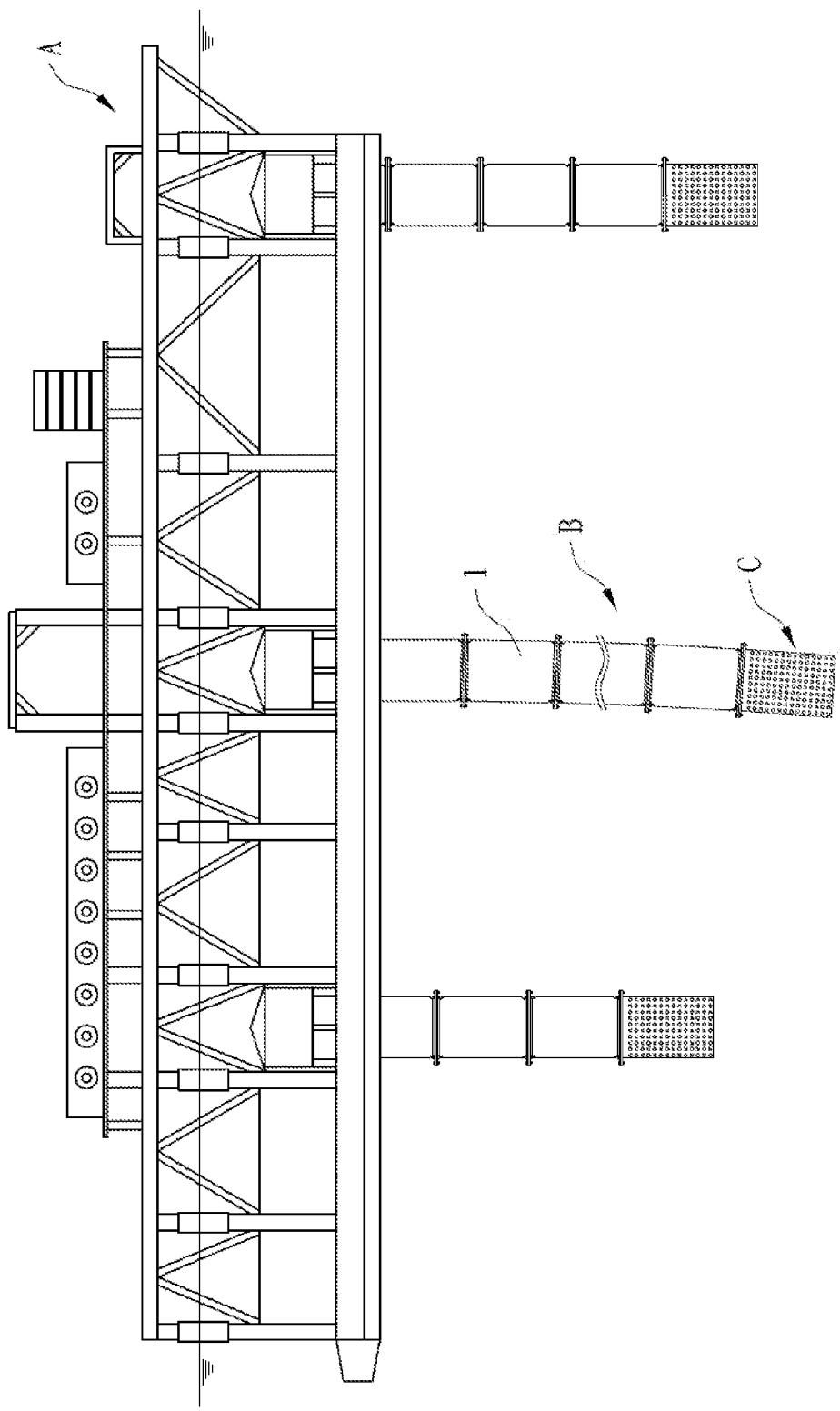
FIG. 1 is a schematic view of a water intake pipe extended into a sea in accordance with the present invention.

The present invention provides a water intake pipe of an ocean thermal energy conversion power plant as shown in FIG. 1, a ship A situated at a sea surface extends a water intake pipe B to the bottom of a sea, and the water intake pipe B includes a water intake head C made of steel and installed at the bottom end of the water intake pipe B, and the ship A includes a water pump provided for pumping cold sea water from the bottom of a deep sea to the sea surface and exchanging heat for an ocean thermal energy conversion.

Figure 2:
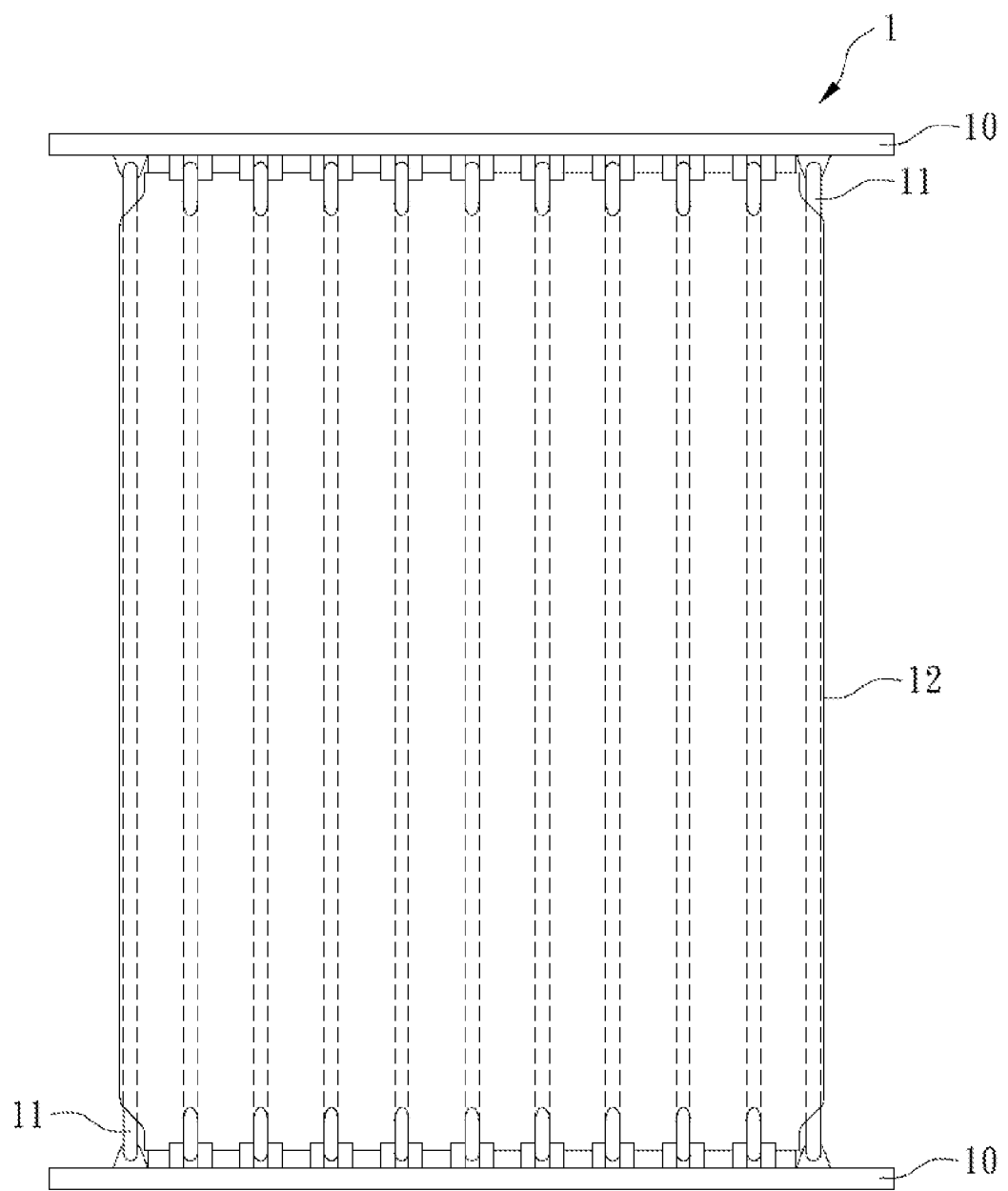
FIG. 2 is a schematic view of a structure of connecting sections in accordance with a first preferred embodiment of the present invention.
Figure 3:
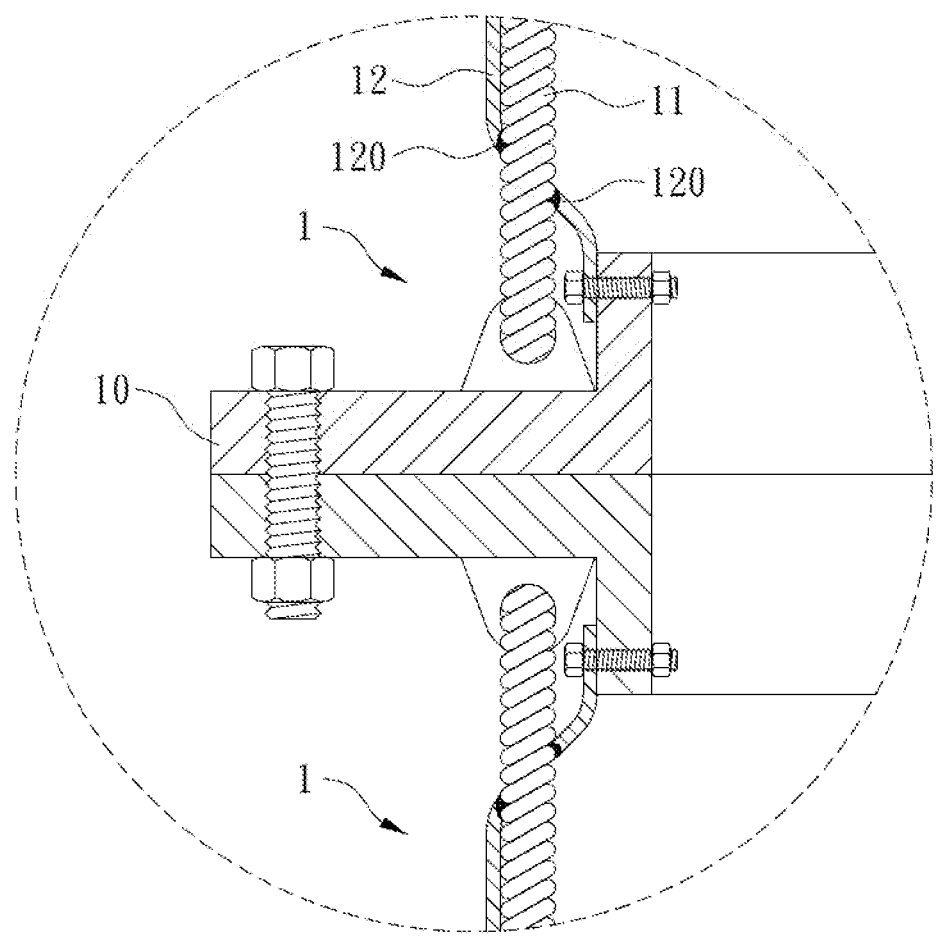
FIG. 3 is a partial enlarged view of connecting a steel rope, a flexible tube and a flange disk in accordance with a first preferred embodiment of the present invention.

In FIGS. 2 and 3, the water intake pipe B is formed by connecting a plurality of connecting sections 1, and each connecting section 1 includes two flange disks 10, a plurality of steel ropes 11, and a flexible tube 12, and each connecting section 1 is fixed by each flange disk 10, and the plurality of steel ropes 11 of each connecting section 1 is wound around the two flange disks 10, and both ends of each steel rope 11 are coupled to the peripheries of the two flange disks 10 respectively, and each connecting section 1 is coupled to the plurality of steel ropes 11 to produce a cage from, and the flexible tube 12 between two flange disks 10 is covered onto an external side of the plurality of steel ropes 11.

In the preferred embodiment as shown in FIGS. 2 and 3, both ends of each flexible tube 12 coupled to the peripheries of the two flange disks 10 are disposed on an internal side of the plurality of steel ropes 11, and each steel rope 11 is passed into the flexible tube 12, and each steel rope 11 proximate to both ends of each flange disk 10 is exposed from the flexible tube 12. In addition, the flexible tube 12 includes a sealing ring 120 installed at a position for passing the steel rope 11 and provided for preventing water pumped into the flexible tube 12 from leaking out at the position of passing the steel rope 11.

Figure 4:
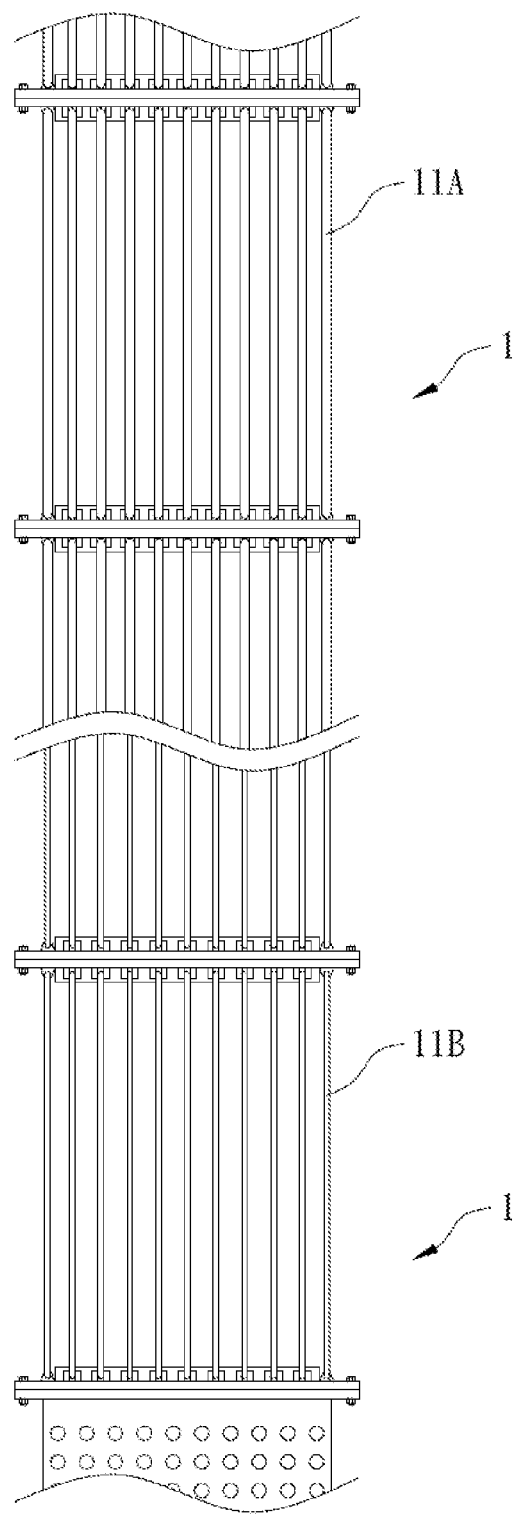
FIG. 4 is a schematic view of a support means in accordance with a first preferred embodiment of the present invention.

The water intake pipe B comprises a support means as shown in FIG. 4, and the size of the support means varies in this preferred embodiment, wherein the connecting section 1 closer to the sea surface adopts a steel rope 11A with a greater diameter, and the connecting section 1 farther from the sea surface adopts a steel rope 11B with a smaller diameter.

Figure 5:
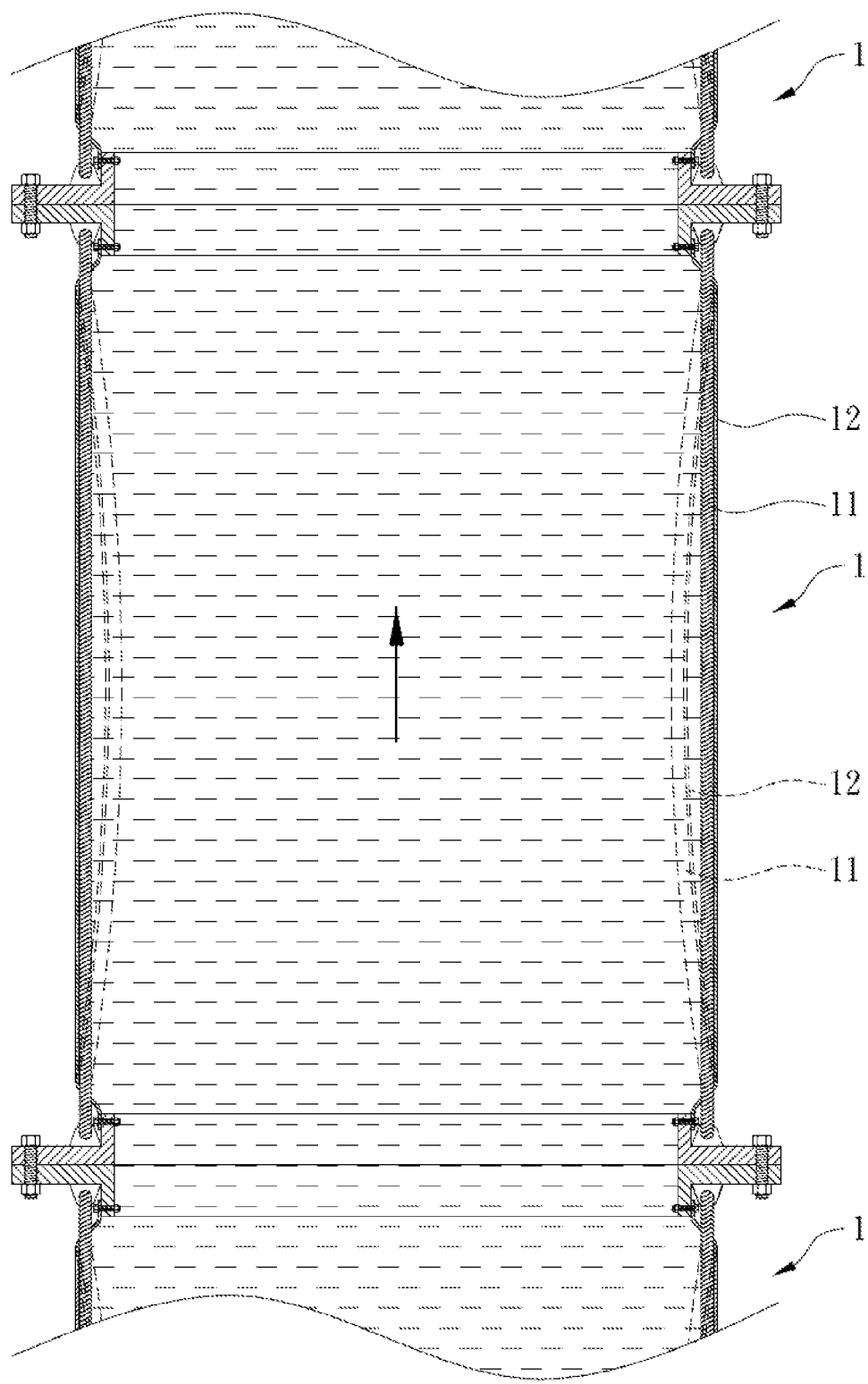
FIG. 5 is a side view of a flexible tube inwardly retracted during a water pumping process in accordance with a first preferred embodiment of the present invention.
Figure 6:
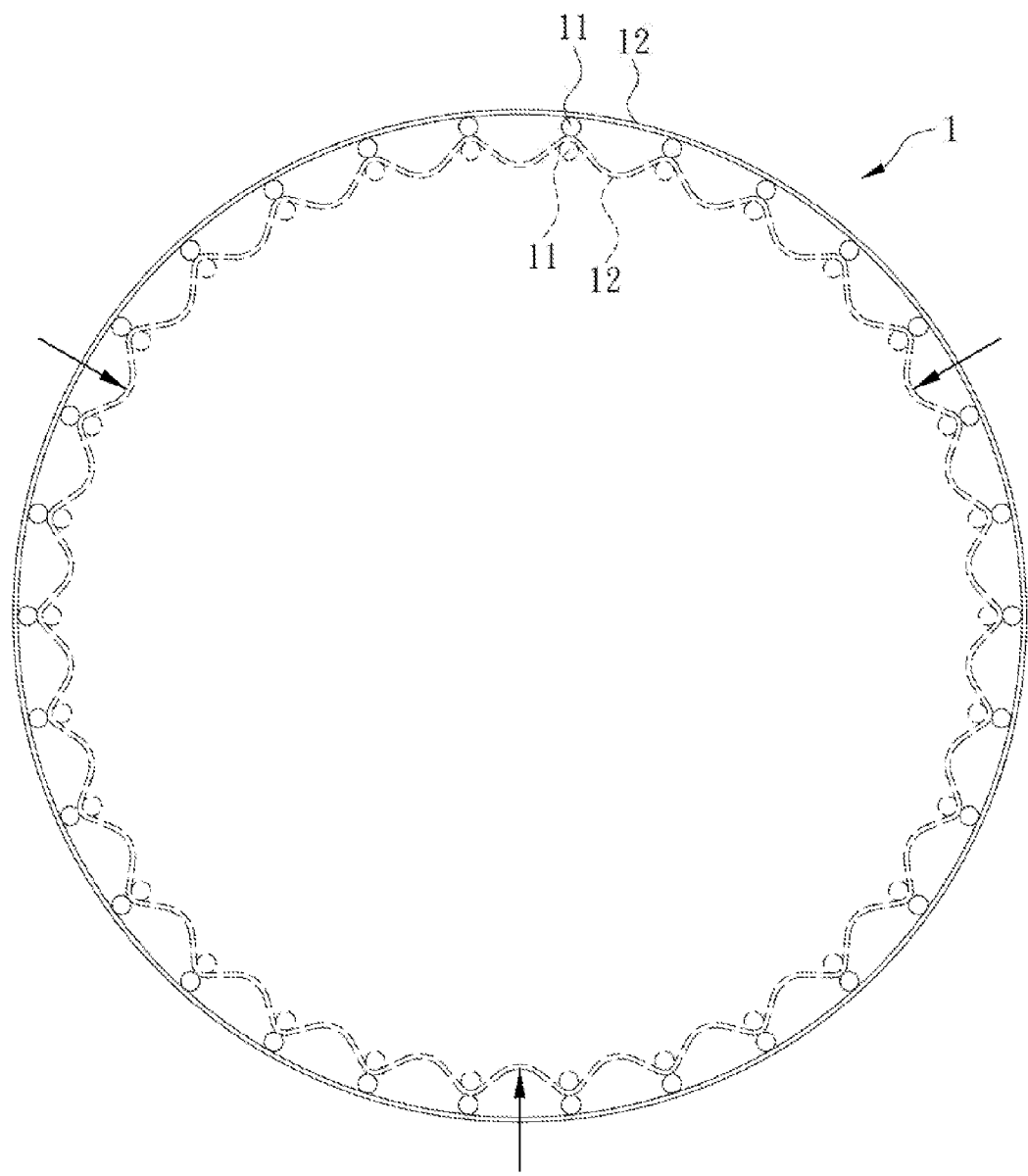
FIG. 6 is a schematic view of a distal surface of a flexible tube inwardly retracted during a water pumping process in accordance with a first preferred embodiment of the present invention.

From the aforementioned structure, it is obvious that each connecting section 1 closer to the sea surface adopts a steel rope 11 with a higher load-carrying capacity, and thus the quantity of connecting sections 1 becomes more, and the longer length of the water intake pipe B allows the water intake pipe to be extended to the bottom of the deep sea, and the connecting section 1 at a deeper position has a steel rope 11 with a reduced diameter since the load carrying is decreased, so that the component cost can be lowered. On the other hand, the steel rope 11 closer to the sea surface as shown in FIGS. 5 and 6 has a greater diameter and a greater tension, such that when the water pump of the ship A pumps water, the pressure caused by the pumping operation still can support the flexible tube 12 to have the desired diameter, and the pressure caused by the pumping operation at the connecting section 1 of a deeper position is lower, so that the diameter of the flexible tube 12 becomes smaller, and the flexible tube 12 of each connecting section 1 can maintain a consistent diameter from the surface to the bottom of the sea.

From the foregoing description of the water intake pipe B of the present invention, the plurality of steel ropes 11 of each connecting section 1 is coupled to the flange disk 10, and the flexible tube 12 is covered onto the plurality of steel ropes 11, and each connecting section 1 of the steel rope 11 has a variable diameter, such that the water intake pipe B of the present invention has a higher load-carrying capacity and can, connect more connecting sections 1 than the conventional water intake pipe. In other words, the water intake pipe B can have sufficient connecting sections 1 to be extended to the bottom of a deep sea, and the diameter of the flexible tube 12 from the surface to the bottom of the sea can be maintained consistently, so that a sufficient quantity of cold sea water can be pumped successfully from the bottom of the deep sea and provided for the heat exchange for the ocean thermal energy conversion operation.

Figure 7:
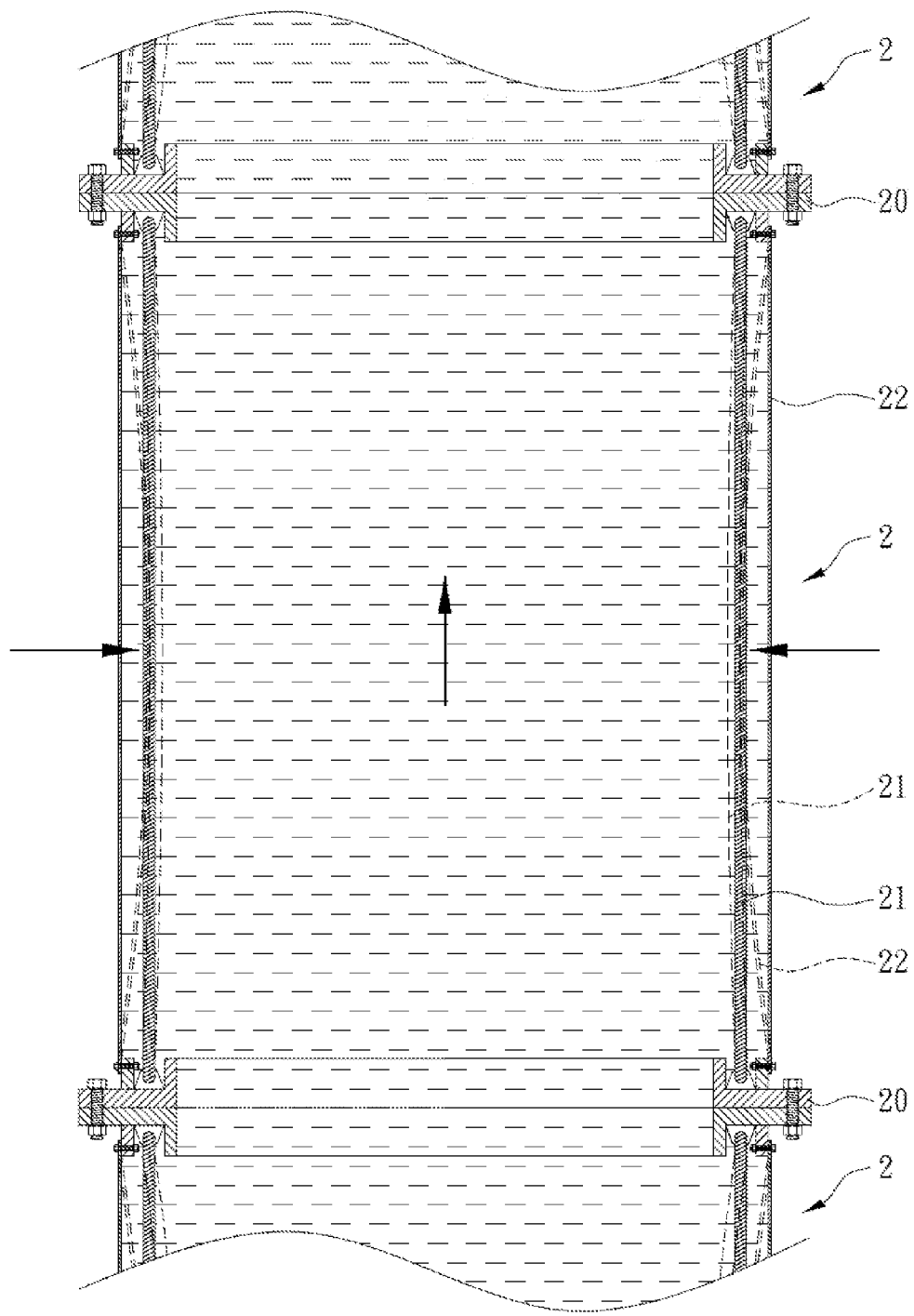
FIG. 7 is a schematic view of a structure of connecting sections in accordance with a second preferred embodiment of the present invention.
Figure 8:
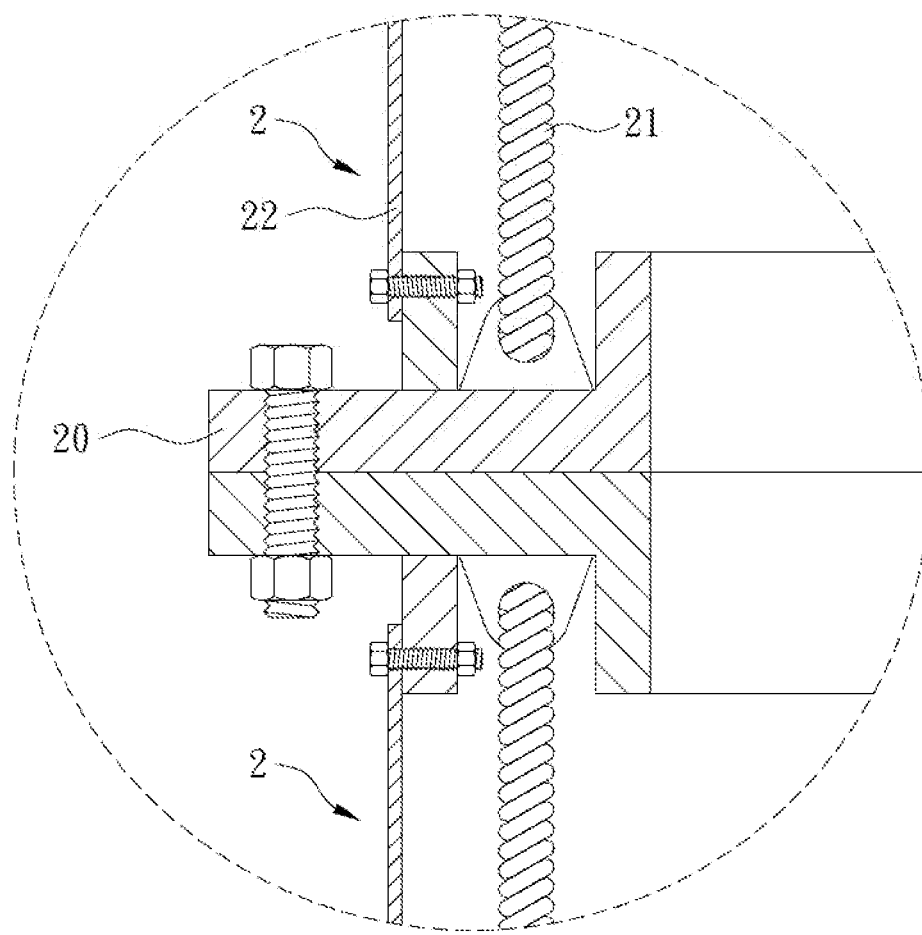
FIG. 8 is a partial enlarged view of connecting a steel rope, a flexible tube and a flange disk in accordance with a second preferred embodiment of the present invention.
Figure 9:
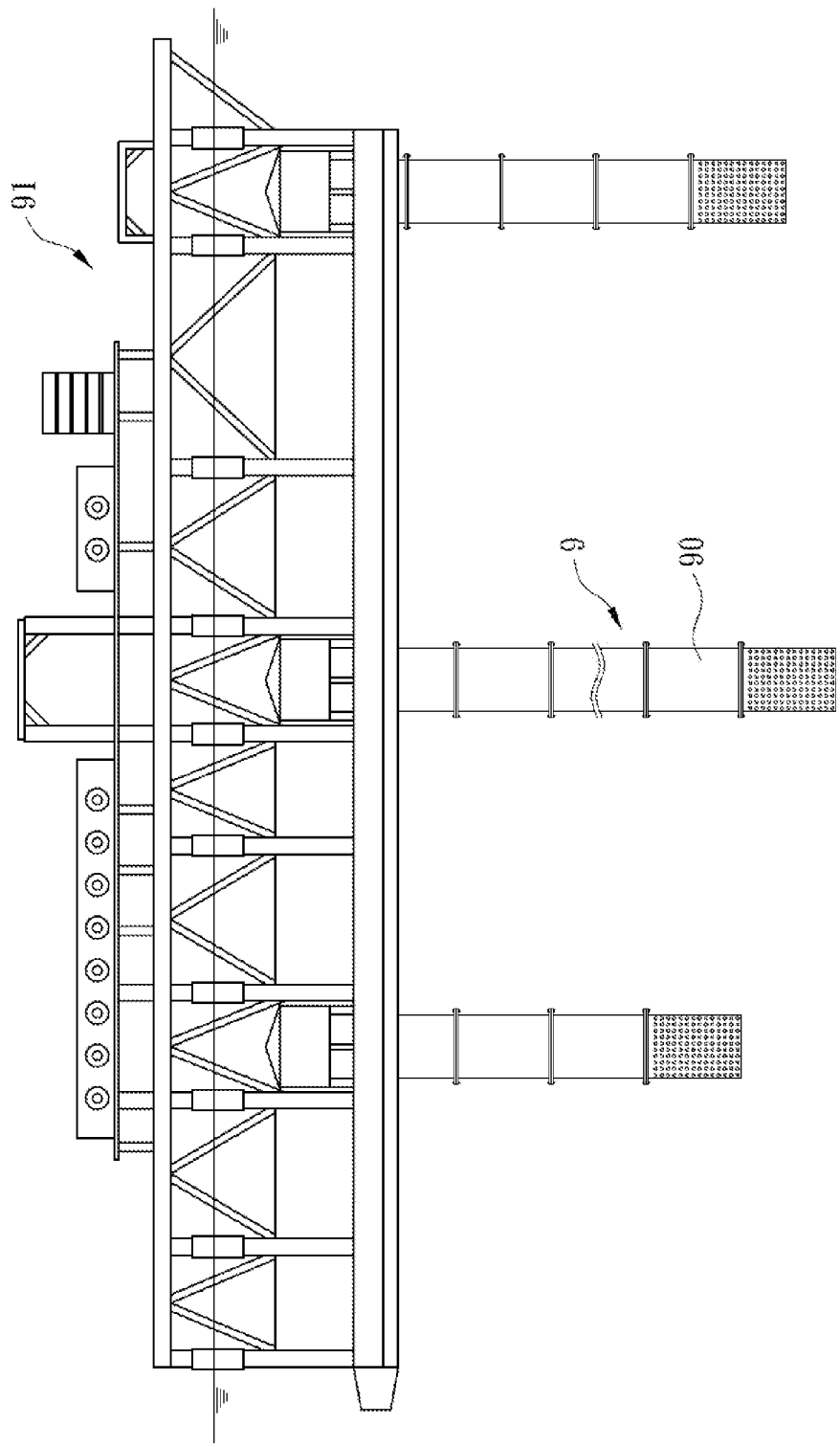
FIG. 9 is a schematic view of a conventional water intake pipe extended into a sea.

Of course, other embodiments of the present invention with minor modifications exist. With reference to FIGS. 7 and 8 for a second preferred embodiment of the present invention, both ends of the flexible tube 22 of each connecting section 2 coupled at the peripheries of the two flange disks 20 respectively are disposed on an external side of the plurality of steel ropes 21, and each steel rope 21 is wrapped into the flexible tube 22 completely to achieve the same effect of the first preferred embodiment.

In addition, the support means adopts different number of steel ropes, and the connecting section 1 closer to the sea surface uses more steel ropes 11, and the connecting section 1 farther from the sea surface uses less steel ropes 11. Alternatively, the size and quantity of steel ropes can be changed for the same purpose. In other words, the connecting section 1 closer to the sea surface can use more steel ropes 11 with a larger diameter, and the connecting section 1 farther from the sea surface can use less steel ropes 11 with a smaller diameter in order to achieve the same effect as the first preferred embodiment.

In summation of the above description, the present invention herein enhances the performance than the conventional structure and further complies with the patent application requirements and is duly filed for patent application. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A water intake pipe of an ocean thermal energy conversion power plant, the ocean thermal energy conversion power plant having a water pump installed at an end of the water intake pipe proximate to a sea surface, characterized in that
 the water intake pipe is formed by connecting a plurality of connecting sections,
 each connecting section comprises
  two flange disks,
  a plurality of steel ropes, and
  a flexible tube, and
  each connecting section being fixed by a corresponding flange disk, and
  the plurality of steel ropes of each connecting section are coupled around the two flange disks to constitute a cage form, and
  each end of each of the steel ropes is coupled to one of the flange disks, and disk, and
  the flexible tube disposed between the two flange disks covers an external side of the plurality of steel ropes, both ends of each of the steel ropes to extending outside of the flexible tube; and
 the water intake pipe comprises
  a support means, and the support means includes
   the plurality of steel ropes with variable size and quantity at each connecting section, the connecting section closer to the sea surface has the steel rope with a higher load-carrying capacity, and the steel rope closer to the sea surface has a greater tension for supporting the flexible tube to be enclosed in a diameter capable of bearing a pressure from pumping of sea water.

2. The water intake pipe of an ocean thermal energy conversion power plant as recited in claim 1, wherein each flexible tube with both ends coupled to the periphery of the two flange disks are disposed on an internal side of the plurality of steel ropes, and each steel rope is passed into the flexible tube, and both ends of each steel rope proximate to each flange disk are exposed from the flexible tube.

3. The water intake pipe of an ocean thermal energy conversion power plant as recited in claim 1, wherein each flexible tube with both ends coupled to the periphery of the two flange disks are disposed on an external side of the plurality of steel ropes, and each steel rope is wrapped into the flexible tube completely.

4. The water intake pipe of an ocean thermal energy conversion power plant as recited in claim 1, wherein the support means adopts a steel rope with a greater diameter for the connection section closer to the sea surface, and a steel rope with a smaller diameter for the connection section farther from the sea surface.

5. The water intake pipe of an ocean thermal energy conversion power plant as recited in claim 1, wherein the support means adopts a connecting section with more steel ropes at a position closer to the sea surface, and a connecting section with less steel ropes at a position farther from the sea surface.

6. The water intake pipe of an ocean thermal energy conversion power plant as recited in claim 1, wherein the support means adopts a larger number of steel ropes and a larger diameter of the steel rope at a position closer to the sea surface, and a smaller number of steel ropes and a smaller diameter of the steel rope at a position farther from the sea surface.

7. The water intake pipe of an ocean thermal energy conversion power plant as recited in claim 1, wherein the water intake pipe includes a water intake head installed at a bottom end of the water intake pipe.

8. The water intake pipe of an ocean thermal energy conversion power plant as recited in claim 1, wherein the flexible tube further includes a plurality of sealing rings for enabling the plurality of steel ropes to extend outside of the flexible tube.

* * * * *